(12) United States Patent
Yamamoto

(10) Patent No.: US 7,216,857 B2
(45) Date of Patent: May 15, 2007

(54) HYDRAULIC ANTIVIBRATION DEVICE

(75) Inventor: Kentaro Yamamoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 181 days.

(21) Appl. No.: 10/524,848

(22) PCT Filed: Oct. 12, 2004

(86) PCT No.: PCT/JP2004/015019

§ 371 (c)(1),
(2), (4) Date: Feb. 18, 2005

(87) PCT Pub. No.: WO2006/040809

PCT Pub. Date: Apr. 20, 2006

(65) Prior Publication Data

US 2006/0097436 A1    May 11, 2006

(51) Int. Cl.
*F16F 13/00* (2006.01)
(52) U.S. Cl. .................... 267/140.13; 267/219
(58) Field of Classification Search .......... 267/140.12, 267/140.13, 140.11, 141, 219
See application file for complete search history.

(56) References Cited

U.S. PATENT DOCUMENTS

| | | | | |
|---|---|---|---|---|
| 4,647,023 A | * | 3/1987 | Ray et al. | 267/219 |
| 4,938,463 A | * | 7/1990 | Miyamoto | 267/140.13 |
| 4,974,818 A | * | 12/1990 | Kato | 267/140.13 |
| 5,104,100 A | * | 4/1992 | Simuttis | 267/140.13 |
| 6,439,556 B1 | * | 8/2002 | Baudendistel et al. | 267/140.15 |
| 6,910,683 B2 | * | 6/2005 | Itoh et al. | 267/140.13 |
| 2002/0171186 A1 | * | 11/2002 | Baudendistel et al. | 267/140.15 |
| 2003/0168789 A1 | * | 9/2003 | Kries et al. | 267/140.13 |

FOREIGN PATENT DOCUMENTS

| | | | |
|---|---|---|---|
| JP | 62-28542 A | 2/1987 | |
| JP | 62-127536 A | 6/1987 | |
| JP | 64-021239 A | 1/1989 | |
| JP | 64-49731 | 2/1989 | |
| JP | 03288036 A | * 12/1991 | ............ 267/140.13 |

(Continued)

OTHER PUBLICATIONS

Japanese Office Action dated Dec. 26, 2006, issued in corresponding Japanese patent application No. 2005-512254.

*Primary Examiner*—James McClellan
*Assistant Examiner*—Mariano Sy
(74) *Attorney, Agent, or Firm*—Westerman, Hattori, Daniels & Adrian, LLP.

(57) ABSTRACT

A hydraulic antivibration device is provided that is capable of suppressing generation of strange sounds while ensuring a low dynamic spring characteristic upon inputting of relatively small amplitude vibration and a high damping characteristic upon inputting of relatively large amplitude vibration. To that end, upon inputting of relatively large amplitude vibration, displacement-regulating ribs of one of sandwiching members serve to regulate displacement of an elastic partition membrane pinched by the sandwiching members thus obtaining a high damping characteristic. The displacement-regulating ribs consist of three pieces extending radially and rectilinearly, so that the area of openings of the sandwiching members is made wide enough to ensure more a low dynamic spring characteristic. Displacement-regulating protrusions of the elastic partition membrane are disposed to correspond to the displacement-regulating ribs thereby ensuring to suppress the generation of strange sounds.

8 Claims, 8 Drawing Sheets

FOREIGN PATENT DOCUMENTS

| | | |
|---|---|---|
| JP | 4-87044 | 7/1992 |
| JP | 6-307491 | 11/1994 |
| JP | 06307491 A * | 11/1994 |
| JP | 2001-27277 | 1/2001 |
| JP | 2002-310223 A * | 10/2002 |
| JP | 2003-294080 | 10/2003 |

* cited by examiner

HYDRAULIC ANTIVIBRATION DEVICE

BACKGROUND OF THE INVENTION

1. Field of the Invention

This invention relates to a hydraulic antivibration device, more particularly to such a hydraulic type of antivibration device that is capable of restraining the generation of strange or unusual sounds (noise) while ensuring a low dynamic spring characteristic upon inputting of vibrations of a relatively small amplitude and a high damping characteristic upon inputting of vibrations of a relatively large amplitude.

2. Description of Related Art

As an antivibration device supporting and securing an automotive engine so as not to transmit the engine vibration to the body frame, a hydraulic type (liquid-filled type) of one is known.

A typical hydraulic antivibration device is constructed so that a first attachment fitting to be mounted to the engine side and a second attachment fitting to be mounted to the body frame side are connected through a vibration-isolating base composed of rubber-like elastomer, and a liquid-filled chamber is formed between a diaphragm attached to the second attachment fitting and the vibration-isolating base. And the liquid-filled chamber is comparted by a partition member into a first and a second liquid chambers, which are in turn brought into communication with each other through an orifice.

According to this hydraulic antivibration device, it is possible to perform a vibration damping function and a vibration isolating function owing to a fluidization effect of fluid between the first and second liquid chambers through the orifice and a vibration-deadening effect of the vibration-isolating base.

For such hydraulic type antivibration devices, further known are a so-called elastic membrane structure, wherein an elastic partition membrane is disposed between the first and second liquid chambers so that a hydraulic pressure variation (hydraulic pressure difference) between both chambers may be absorbed by deformation of the elastic partition membrane due to reciprocating motion thereby to obtain a low dynamic spring characteristic upon inputting of a small amplitude vibration (JP Patent Application Publication 2001-27277 A, e.g., FIG. 12), a so-called movable membrane structure, wherein displacement-regulating members are provided at both sides of the elastic partition membrane so that the displacement magnitude of the elastic partition membrane may be regulated from the both sides to increase the stiffness of the membrane thereby enhancing a vibration-damping characteristic upon inputting of a large amplitude vibration (JP Patent No. 2875723, e.g., FIG. 4), and so forth.

With the elastic partition membrane structure mentioned above, however, the problem of strange sounds, which will be later described, does not arise, yet the stiffness of the elastic partition membrane is constant irrespective of amplitudes, so that when a low dynamic spring characteristic will be obtained upon inputting of a small amplitude vibration, the hydraulic pressure difference between both liquid chambers is easy to be alleviated by the elastic partition membrane, upon inputting of a large amplitude vibration. As a consequence, the problem here was that it was unable to exhibit sufficiently the fluidization effect of fluid, causing a significant reduction in damping characteristic.

On the other hand, in the movable membrane structure, the opening area for transferring the hydraulic variation of the first liquid chamber or the second liquid chamber to the elastic partition membrane is narrowed by the space amount in which the displacement-regulating member is disposed. Thus it was unable to transmit the hydraulic pressure variation between both liquid chambers efficiently to the elastic partition membrane, with the result that the hydraulic pressure difference was difficult to be alleviated by the elastic partition membrane and hence it was hard to obtain a low dynamic spring characteristic.

Further problem with the movable membrane structure was that because of the structure that the elastic partition membrane is made to abut against the displacement-regulating member, upon abutting thereof the displacement-regulating member is oscillated, which oscillation is transmitted to the body frame, thereby generating strange sounds.

SUMMARY OF THE INVENTION

The present invention has been made to solve the problems described above, and accordingly, it is an object of the invention is to provide a hydraulic antivibration device that is capable of suppressing the generation of strange sounds while ensuring a low dynamic spring characteristic upon inputting of a relatively low amplitude vibration and a high damping characteristic upon inputting of a relatively high amplitude vibration.

To achieve the foregoing object, the hydraulic antivibration device according to this invention comprises a first attachment fitting, a cylindrical second attachment fitting, a vibration-isolating base interconnecting the second attachment fitting and the first attachment fitting and composed of a rubber-like elastomer, a diaphragm fitted to the second attachment fitting to form a liquid-filled chamber between the diaphragm and the vibration-isolating base, a partition unit dividing the liquid-filled chamber into a first liquid chamber on the vibration-isolating base side and a second liquid chamber on the diaphragm side, and an orifice bringing the first liquid chamber and the second liquid chamber into communication with each other, the partition unit including an elastic partition membrane composed of a rubber-like elastomer, a cylinder member accommodating the elastic partition membrane, and a pair of sandwiching members regulating the displacement of the elastic partition membrane so accommodated from both surface sides thereof. And in the foregoing hydraulic antivibration device, the one pair of sandwiching members include each an opening defined in a generally circular form and three displacement-regulating ribs extending from a substantially central position of the opening toward a marginal portion of the opening radially and rectilinearly such that respective displacement-regulating ribs are disposed substantially equidistantly in the circumferential direction; the one sandwiching member of the pair of sandwiching members is formed integrally with the cylinder member on its inner peripheral face side whereas the other sandwiching member is press fitted in the cylinder member on the inner peripheral face side; the elastic partition membrane is provided with a main membrane body formed in a generally disc form having a larger diameter than the openings of the sandwiching members and, on either face of the main membrane body, with three displacement-regulating protrusions extending radially and rectilinearly from a nearly central portion of the main membrane body toward a marginal portion of the main membrane body and projecting on either face side, the three displacement-regulating protrusions on each face side being disposed substantially equidistantly in the circumferential direction; the respective displacement-regulating protrusions have top portions whose height is set in a dimension such that the top portions can abut against the displacement-regulating ribs, and are formed so that a protrusion width of the top portions is narrower than or equal to a protrusion width of foot portions thereof and the protrusion width of the foot portions is wider than the rib width of the displacement-regulating ribs; in an assembled state of the partition unit, the marginal portion of the main membrane body is pinched and held by the sandwiching members over the full circumference of the marginal portion from both surface sides thereof and respective displacement-regulating protrusions are disposed in corresponding positions to the respective displacement-regulating ribs.

Further, the hydraulic antivibration device described above advantageously may include the following features (1) to (3) taken singly or in any combination that is technically feasible:

(1) The displacement-regulating protrusions are each formed so that the protrusion width at top portions thereof is wider than the rib width at the displacement-regulating ribs;

(2) The cylinder member is provided with a raised portion protruding on its inner peripheral surface side; and the elastic partition membrane and the other sandwiching member are provided, on outer margins of them, with recessed portions formed by cutting out at the outer margins and capable of mating with the raised portion; in the assembled state of the partition unit, the partition unit is constructed so that the raised portion is mated in the recessed portions and thereby a relative rotational direction position of a pair of the sandwiching members and the elastic partition membrane is positioned and respective displacement-regulating protrusions are disposed in corresponding positions to the respective displacement-regulating ribs;

(3) On at least one surface side of the main membrane body, auxiliary protrusions are provided to project in other residual area than the places where the displacement-regulating protrusions are provided, and the auxiliary protrusions are constructed to be lower in protrusion height and narrower in protrusion width than the displacement-regulating protrusions.

According to the hydraulic type antivibration device of this invention as generically described above, a variety of effects can be achieved as described below.

Because upon inputting of a relatively small amplitude vibration, the elastic partition membrane is subject to displacement by its reciprocating motion to enable a hydraulic pressure difference between the first and second liquid chambers to be relieved (absorbed), it is possible to achieve a reduction in dynamic spring value thereby to obtain a low dynamic spring characteristic.

More particularly, because the three displacement-regulating ribs only are provided to extend radially and rectilinearly at the opening of each sandwiching member, it is possible to make the area of the opening wide enough to transmit a hydraulic pressure difference between the first and second liquid chambers efficiently to the elastic partition membrane. As a result, the hydraulic pressure difference can be efficiently relieved to obtain the intended low dynamic spring characteristic more securely.

On the other hand, upon inputting of a relatively large amplitude vibration, it is possible to regulate displacement of the elastic partition membrane by the displacement-regulating ribs of the sandwiching members to elevate the stiffness of the overall elastic partition membrane, and hence, the effect of enhancing the damping characteristic to obtain a high damping characteristic can be achieved.

In particular, because a full circumference of the marginal portion of the elastic partition membrane (main membrane body) is constructed to be pinched and held by a pair of the sandwiching members from both surface sides thereof, it is possible to fluidize the liquid only in a path passing through the orifice, while avoiding the liquid from fluidizing between the first and second liquid chambers in a path passing through the openings of the sandwiching members. Therefore it is possible to exhibit efficiently the fluidization effect of the fluid to obtain a high damping characteristic.

Again because of the arrangement that three pieces of the displacement-regulating ribs are disposed substantially equidistantly in the circumferential direction, when regulating the displacement of the elastic partition membrane, it is possible to deform the elastic partition membrane more evenly without the deformation being localized (deviated partially). As a consequence, the effect of efficiently enhancing the stiffness of the elastic partition membrane to secure a high damping characteristic can be achieved.

Further by the arrangement that the three displacement-regulating ribs are disposed nearly equidistantly in the circumferential direction, an intersecting angle of the respective ribs is made sufficiently large, so that it is possible to avoid a strain of the elastic partition membrane from concentrating on the neighborhood of an intersecting area of the respective ribs. As a result, the durability of the elastic partition membrane as a whole can be enhanced.

Otherwise in the case where the displacement-regulating ribs in excess of three pieces (namely, four or more) are provided, the intersecting angle of the respective ones is smaller (90 degrees or less), and consequently, when the elastic partition membrane reciprocates to be displaced by a hydraulic pressure difference, the deformation (strain) of the elastic partition membrane concentrates on the vicinity of the intersecting area of respective displacement-regulating ribs, which posed a problem of failure such as tearing of the membrane.

Further in the conventional hydraulic antivibration devices, because multiple annular displacement-regulating ribs are provided in addition to the radially, rectilinearly disposed displacement-regulating ribs, multiple places of a small intersecting angle are formed, and a failure attributed to concentration of deformation (strain) as is the case with the above raised a problem.

In contrast, according to the hydraulic antivibration device of this invention, because of the construction that three pieces of the displacement-regulating ribs are provided radially and rectilinearly at the circular opening at equal intervals in the circumferential direction, it is possible to make the intersecting angle of the respective displacement-regulating ribs sufficiently large (120 degrees) and further because of the absence of such annular displacement-regulating ribs, when the elastic partition membrane reciprocates to be displaced, it is possible to make its deformation (strain) equal as a whole thereby suppressing effectively the occurrence of any failure such as tearing of the membrane.

Here, in the assembled state of the partition unit, the displacement-regulating protrusions of the elastic partition membrane are disposed only in corresponding positions to the displacement-regulating ribs of the sandwiching members and simultaneously are set in a height dimension such that top portions of them can abut on the displacement-regulating ribs, and hence the effect of ensuring to suppress the generation of strange sounds is achieved.

That is, if the displacement-regulating protrusions are not provided in corresponding positions to the displacement-regulating ribs, a large gap is produced between the ribs and the elastic partition membrane (main membrane body) and the elastic partition membrane (main membrane body) will collide with the displacement-regulating ribs upon inputting of large amplitude vibration, which is responsible for generation of strange sounds. On the contrary, where the displacement-regulating protrusions are disposed in the corresponding positions to the displacement-regulating ribs, with the top portions of the protrusions abutting on the ribs, it is possible to avoid the collision of the elastic partition membrane (the main membrane body and the displacement-regulating protrusions) with the displacement-regulating ribs, thereby ensuring to suppress the generation of strange sounds.

Further if the displacement-regulating protrusions are not provided in the corresponding positions to the displacement-regulating ribs, but there exist the gap, then a stiffness strength for receiving the collision of the elastic partition membrane (main membrane body) will be required for the ribs. In contrast, where the displacement-regulating protrusions are disposed to correspond to the displacement-regulating ribs, a load acting on the ribs can be reduced to such an extent that it is possible to achieve the effect that the durability of the sandwiching members (displacement-regulating ribs) is enhanced.

And when the load acting on the respective displacement-regulating ribs can be reduced, it is possible to decrease a required stiffness strength and to that extent, it is possible to make the rib width of the displacement-regulating ribs narrower. As a result, due to the narrowed rib width it is possible to enlarge the area of the openings of the sandwiching members, so that it is possible to enhance a transmission efficiency of transmitting the hydraulic pressure difference between the first and second liquid chambers to the elastic partition membrane and accordingly, to relieve efficiently the hydraulic pressure difference. Therefore a low dynamic spring characteristic can be obtained more securely.

Here, the displacement-regulating protrusions of the elastic partition membrane is formed so that the protrusion width of the top side thereof is narrower than or equal to that of the foot side (main membrane body side), and the protrusion width at the foot side of the displacement-regulating protrusions is wider than the rib width of the displacement-regulating ribs.

Stated another way, because the displacement-regulating protrusions are constructed at least so that the protrusion width of the foot side is wider than the rib width of the displacement-regulating ribs, even where a relatively large amplitude vibration is input and the elastic partition membrane reciprocates to be displaced, collision of the elastic partition membrane with the ribs is suppressed, enabling the generation of strange sounds to be suppressed.

In particular, even in the case where the displacement-regulating protrusions are deviated in the circumferential direction relative to the displacement-regulating ribs due to a dimensional tolerance of respective component parts or assembling tolerance upon assembling working, under the condition that the protrusion width at the foot side of the displacement-regulating protrusions is made wider than the rib width of the displacement-regulating ribs, it is possible to alleviate the collision of the ribs with the elastic partition membrane to effectively suppress the generation of strange sounds attributed to the collision.

Again according to the hydraulic antivibration device of the invention, because the one sandwiching member of the pair of sandwiching members is formed integrally with the cylinder member on its inner peripheral surface side, no laborious assembling work is needed to conduct and to that extent, working cost upon assembling can be reduced.

Further because the other sandwiching member is constructed to be mated and press fitted in the cylinder member on its inner peripheral surface side, it is possible to fix firmly the other sandwiching member. Therefore it is possible to preset accurately a distance between opposing surfaces of the sandwiching member and the elastic partition membrane and a relative position of the displacement-regulating ribs to the elastic partition membrane (displacement-regulating protrusions), thus enabling a further reduction of strange sounds.

According to the hydraulic antivibration device further characterized by the specific feature (1) above, in addition to the effects described above, further effects are achieved. That is, because the displacement-regulating protrusions are formed such that the protrusion width on their top side is wider than the rib width of the displacement-regulating ribs, it is possible to suppress the production of air pockets at the top of the protrusions. Thus a reduction of dynamic characteristic ascribed to the air pockets (air bubbles) remaining there can be suppressed. After the assembling work of the partition unit is performed outside a liquid tank, the resulting assembled product can be mounted on the second attachment fitting on its inner peripheral face side within the liquid tank, and consequently, it is possible to simplify the assembling process steps thus achieving a significant reduction in working cost.

More specifically stated, in order to suppress the generation of strange sounds as stated above, the displacement-regulating protrusions are formed so that the protrusion width of the foot side is wider than the rib width of the displacement-regulating ribs. Thus if the protrusion width at the top side is made narrower than the rib width of the displacement-regulating ribs, then such a tapered-off space will be formed in the vicinity of the top of each displacement-regulating protrusion that becomes narrower toward the deepest place. When the air pockets (air bubbles) are produced within the liquid chamber, the vibration controlling function based on the liquid fluidization effect cannot be exhibited, and consequently, the elimination of the air bubbles is necessitated. However the air bubbles remaining in the space of such shape are extremely hard to remove, giving rise to a remarkable increase in working cost. For that reason, with the conventional hydraulic type antivibration devices, the partition means was necessitated to assemble within a liquid tank, so that the assembling step became laborious and hence there was the problem of rise in working cost.

According to the hydraulic antivibration device further characterized by the feature (2) above alone or in combination with the feature (1), in addition to the effects described above, further effect can be attained, wherein the raised portion jutting toward the inner peripheral surface side of the cylinder member is received in and mated with the recessed portions cut out at the outer peripheral margins of the elastic partition membrane and the other sandwiching member, thus performing the positioning of a relative rotational direction position of the pair of sandwiching members and the elastic partition membrane, whereby it is possible to dispose the respective displacement-regulating protrusions in corresponding positions to the displacement-regulating ribs with good accuracy. As a result it is possible to suppress the trouble that dynamic characteristic varies depending upon every product due to variation in abutting state of the displacement-regulating protrusions and the displacement-regulating ribs.

Further since the raised portion is constructed to jut on the inner peripheral surface side of the cylinder member, it is possible to suppress that the diameter of the cylinder member becomes large and its weight is increased, thereby achieving a downsizing and weight reduction of the overall hydraulic antivibration device. That is, if a recessed portion is constructed to be provided on the inner peripheral surface side of the cylinder member, there will be a necessity of ensuring the wall thickness of the drum part of the cylinder member by that recessed amount, leading to a large diameter and a weight increase of the cylinder member, and to that extent, the overall hydraulic antivibration device is large-sized and increased in weight.

According to the hydraulic antivibration device further characterized by the feature (3) above alone or in combination with the feature (1) and/or (2) above, additional effects to the effects described above are achieved in that because the elastic partition membrane is provided with the auxiliary protrusions, it is possible to suppress any trouble of the elastic partition membrane attended by the displacement upon inputting of a large amplitude vibration, thereby to enhance the durability. And because the auxiliary protrusions are constructed to be lower in protrusion height and narrower in protrusion width than the displacement-regulating protrusions, it is possible to suppress that the stiffness of the elastic partition membrane as a whole is increased thereby to maintain a low dynamic spring characteristic upon inputting of small amplitude vibration.

DESCRIPTION OF THE PREFERRED EMBODIMENTS

Figure 1:
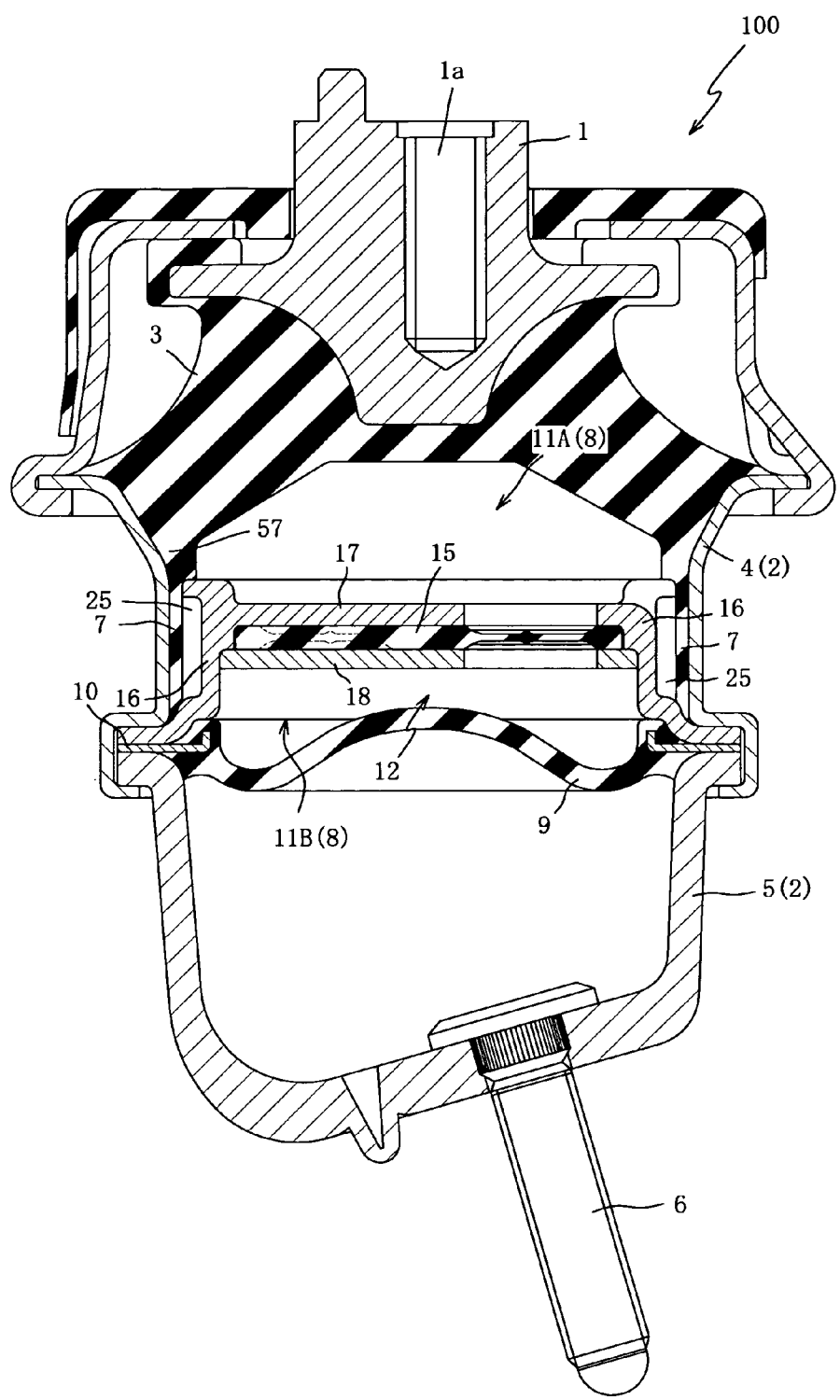
FIG. 1 is a sectional view of a hydraulic antivibration device in one embodiment of this invention.

Preferred embodiments of the invention will be hereinafter described in more detail with reference to the accompanying drawings. Referring to FIG. 1, a hydraulic antivibration device 100 in one embodiment of this invention will be described.

The hydraulic antivibration device 100 is to support and secure an automotive engine so as not to transmit engine vibrations to the car body frame, and includes a first attachment fitting 1 to be attached to the engine side, a cylindrical second attachment fitting 2 to be attached to the car body frame side below the engine, and a vibration-isolating base 3 made of rubber-like elastomer interconnecting the both.

The first attachment fitting 1 is fashioned from a metal material such as aluminum in a generally columnar shape and is hollowed at its upper end face to be defined with a female part 1a, as shown. At the outer periphery of the first attachment fitting 1 there is formed a flange-like projecting portion, which is constructed to abut against a stabilizer fitting so that upon large displacement, a stopper action may be obtained.

The second attachment fitting 2 is constructed of a cylindrical fitting 4, to which the vibration-isolating base 3 is vulcanization molded, and a bottom fitting 5 attached to the underside of the cylindrical fitting 4. The cylindrical fitting 4 and the bottom fitting 5 are configured, respectively, in a cylinder shape having an upwardly splaying opening and in a cup shape having a slanting bottom part, and both made of iron and steel material or the like. The bottom fitting 5 is provided at its bottom part with an attachment bolt 6 so as to project.

The vibration-isolating base 3 is fashioned in a truncated pyramid shape from a rubber-like elastomer and vulcanization bonded between the underside of the first attachment fitting 1 and the upper end opening of the cylindrical fitting 4. To the lower end of the vibration-isolating base 3 is united a rubber membrane 7 covering the inner peripheral face of the cylindrical fitting 4. To the rubber membrane 7, orifice-forming walls 22, 23 (cf. FIGS. 2A to 3B) of an orifice member 16, which will be hereinafter described, are fayed, thus forming an orifice 25.

A diaphragm 9 is configured in a rubber membrane form having a partially sphere shape from a rubber-like elastomer and vulcanization bonded to a fitting plate 10 assuming a donut form when viewed from the top plan. As shown in FIG. 1, the fitting plate 10 is fixed between the cylindrical fitting 4 and the bottom fitting 5 by crimping, whereby the diaphragm 9 is attached to the second attachment fitting 2. As a result, there is formed a liquid-filled chamber 8 between the diaphragm 9 and the underside of the vibration-isolating base 3.

The liquid-filled chamber 8 is sealed with a non-freezing liquid (not shown), e.g., ethylene glycol. The liquid-filled chamber 8 is comparted into two chambers, a first liquid chamber 11A on the vibration-isolating base 3 side and a second liquid chamber 11B on the diaphragm 9 side, by a partition unit 12, which will be described hereinafter.

The partition unit 12 is made up of an elastic partition membrane 15 made of rubber membrane in a nearly disk form, an orifice member 16 accommodating the elastic partition membrane 15 on its inner peripheral surface side and formed integrally with a first sandwiching member 17, and a second sandwiching member 18 in a grid disc form internally fitted in the orifice member 16 from an opening thereof at its underside (a lower side of FIG. 1).

The partition unit 12 is inserted into the second attachment fitting 2 (the cylindrical fitting 4), with the outer periphery of the diaphragm 9 and a step portion 57 of the vibration-isolating base 3 deformed under compression in the axial direction (the vertical direction in FIG. 1), and pinched and held within the liquid-filled chamber 8 by reason of elastic recovery force of the diaphragm 9 (an outer periphery) and the vibration-isolating base 3 (the step portion 57).

Between the outer peripheral surface of the orifice member 16 and the rubber membrane 7 covering the inner peripheral surface of the second attachment fitting 2, there is formed an orifice 25 as shown. The orifice 25 is an orifice passage for putting the first liquid chamber 11A and the second liquid chamber 11B into communication with each other and fluidizing liquid between both liquid chambers 11A, 11B, and formed to circle in a substantially full round about an axis center O of the orifice member 16.

The elastic partition membrane 15 is pinched and held by and between the first and second sandwiching members 17, 18 over a full circumference of its outer periphery with no clearance. Therefore the liquid within the liquid-filled chamber 8 flows only through the orifice 25 between the first liquid chamber 11A and the second liquid chamber 11B without leaking through openings 17a, 18a, which will be described later, between the first and second liquid chambers 11A, 11B.

Figure 2A:
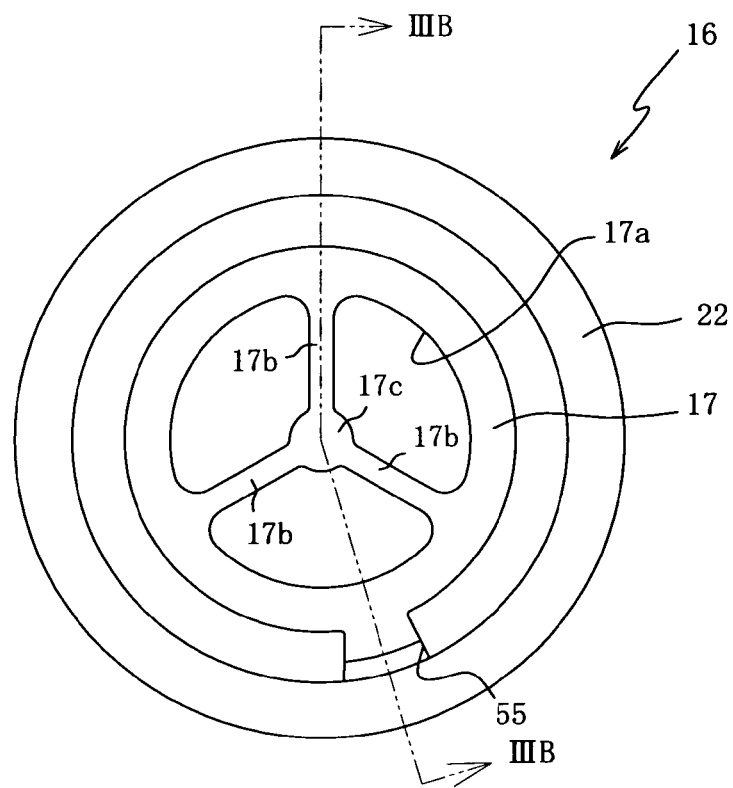
FIG. 2A and FIG. 2B are a top plan view and a side elevation, respectively, of an orifice member.

Now referring to FIGS. 2A, 2B, 3A, 3B, the orifice member 16 constituting the partition unit 12 will be described. The orifice member 16 is illustrated in FIG. 2A (top face), FIG. 2B (side elevation), FIG. 3A (bottom face) and FIG. 3B (cross-section in IIIB-IIIB line of FIG. 2A).

The orifice member 16 is, as shown, configured in a generally cylindrical shape having the axis center O from metal material such as aluminum alloy. At axially upper and lower ends of the orifice member 16, the orifice-forming walls 22, 23 in a nearly flange form are provided to project, and the orifice passage (channel) is formed between opposing faces of the orifice-forming walls 22, 23.

Figure 2B:
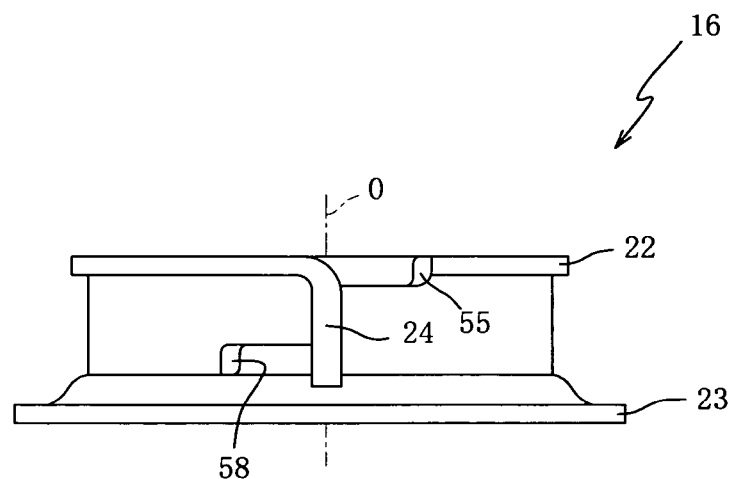

As described above, the orifice-forming walls 22, 23 fay the rubber membrane 7 covering the inner periphery of the cylindrical fitting 4, thereby forming the orifice 25 in a generally rectangular form in cross-section (cf. FIG. 1). The orifice member 16 is also provided with a longitudinal wall 24 linking the upper and lower orifice-forming walls 22, 23 as shown in FIG. 2B, and the orifice 25 (cf. FIG. 1) is separated by the longitudinal wall 24 in the circumferential direction.

Figure 3A:
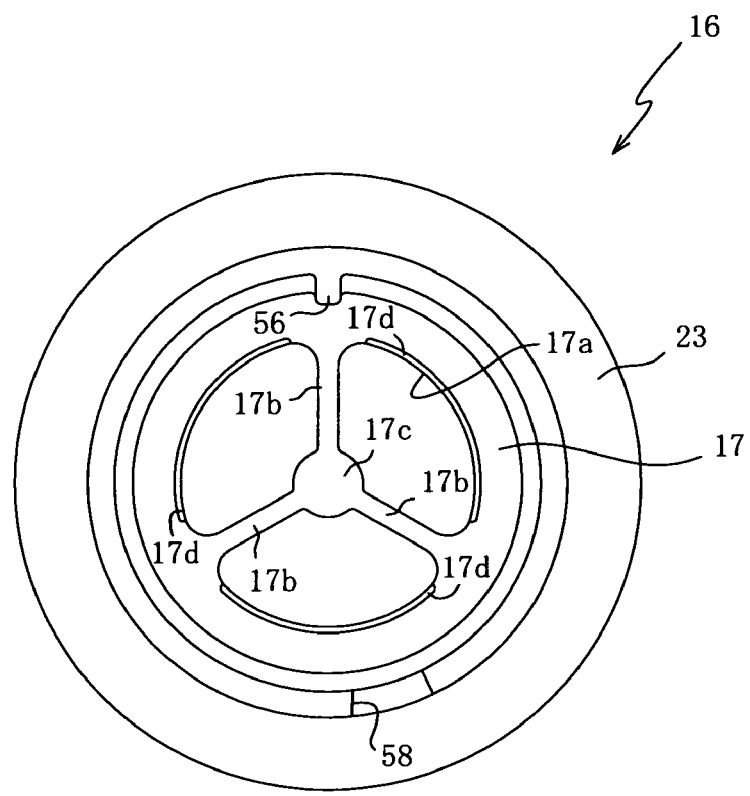
FIG. 3A and FIG. 3B are, respectively, a bottom view of the orifice member and a sectional view of the orifice member taken along IIIB-IIIB line in FIG. 2A.
Figure 3B:
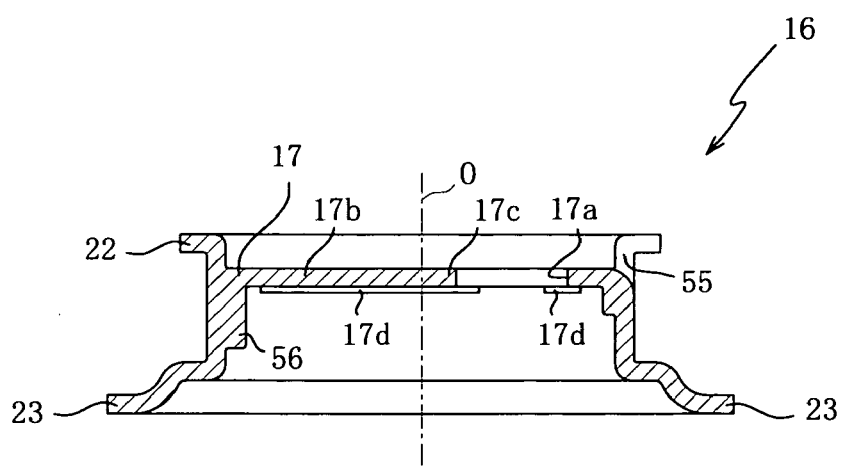

The lower orifice-forming wall 23 has, as illustrated in FIG. 3B, a stepped portion and is formed to jut radially beyond the upper orifice-forming wall 22. The orifice-forming wall 23 is fixed between the cylindrical fitting 4 and the bottom fitting 5 by crimping, whereby the orifice member 16 is fitted to the second attachment fitting 2 (cf. FIG. 1).

As shown, the upper orifice-forming wall 22 is defined with a cutout 55, through which one end of the orifice passage (orifice 25; cf. FIG. 1) is put in communication with the first liquid chamber 11A. The drum part of the orifice member 16 is apertured with an opening 58, through which the other end of the orifice passage is put in communication with the second liquid chamber 11B.

As illustrated in FIGS. 3A and 3B, the orifice member 16 is provided integrally with a raised portion 56 projecting on its inner peripheral surface side. The raised portion 56 is received in recessed portions 59, 54 of a second sandwiching member 18 (described later) and the elastic partition membrane 15, respectively, thereby serving to perform a positioning of a relative rotational direction position of the second sandwiching member 18 and the elastic partition membrane 15 to the orifice member 16 (the first sandwiching member 17).

The orifice member 16 is, on the inner peripheral surface side, further formed integrally with the first sandwiching member 17 assuming a generally disk form, as shown. The first sandwiching member 17 is comprised of an opening 17a apertured in a nearly circular form and three displacement-regulating ribs 17b extending radially and rectilinearly from a virtually central position of the opening 17a toward a peripheral margin thereof.

The opening 17a is an escape means for transmitting a hydraulic pressure fluctuation in the liquid-filled chamber 8 (the first liquid chamber 11A) to the elastic partition membrane 15 and averting collision with the elastic partition membrane 15 displaced by the hydraulic pressure fluctuation (cf. FIG. 1) and is apertured by the displacement-regulating ribs 17b in a tri-sected circle form.

The displacement-regulating ribs 17b serve to abut against displacement-regulating protrusions 51 (cf. FIGS. 5A, 5B), which will be hereinafter described, of the elastic partition membrane 15 to constrain (regulate the displacement of) the elastic partition membrane 15. As shown in FIGS. 2A, 2B, 3A, 3B, three pieces of them are formed radially and in a straight-line fashion relative to the axis center O of the orifice member 16.

The respective displacement-regulating ribs 17b are formed to be substantially the same in rib width and rib thickness. The respective displacement-regulating ribs 17b are disposed nearly equidistantly (ca. 120 degrees distance) in the circumferential direction, thus making an intersecting angle of the displacement-regulating ribs 17b of ca. 120 degrees.

At an intersection (the central part of the opening 17a) of the respective displacement-regulating ribs 17b, a strain-inhibiting portion 17c in a generally circular form is formed, as shown. The strain-inhibiting portion 17c has a function of equalizing the deformation state of the elastic partition membrane 15, and restrains a concentration of the deformation magnitude of the elastic partition membrane 15 on the vicinity of the intersection of the displacement-regulating ribs 17b, thereby enhancing the durability of the elastic partition membrane 15.

At the underside of the first sandwiching member 17, arresting (captive) wall portions 17d are provided vertically in positions alongside of the marginal portion of the opening 17a, as shown in FIGS. 3A and 3B. The arresting wall portions 17d serve to engage and catch a slanting surface of the elastic partition membrane 15 (a pinched portion 50a) thereby to perform a positioning of the elastic partition membrane 15 in the radial direction.

Thereby at the assembling process step of the partition unit 12, it is possible to perform the positioning of the elastic partition membrane 15 with ease to achieve a curtailment of working cost, and concurrently to enhance the positioning accuracy (positional accuracy of the displacement-regulating protrusions 51 to the displacement-regulating ribs 17b) to reduce a dispersion of dynamic characteristics among products.

The arresting wall portions 17d are, as illustrated in FIG. 3A, formed at three places in the circumferential direction, but not in positions corresponding to the displacement-regulating ribs 17b. Thereby, an enhancement in dynamic characteristics is achieved while ensuring the area of contact of the displacement-regulating ribs 17b with the displacement-regulating protrusions 51 (a high damping characteristic is ensured while retaining a low dynamic spring characteristic).

Figure 4A:
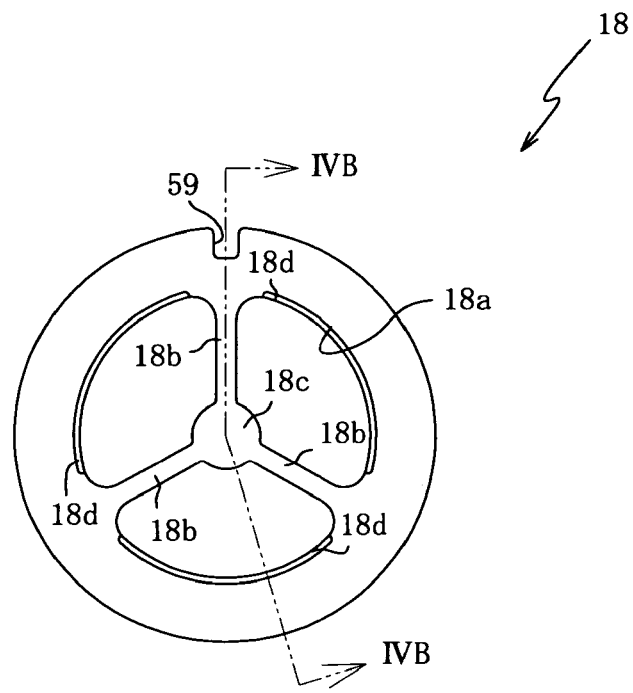
FIG. 4A and FIG. 4B are a top plan view and a sectional view taken along IVB-IVB line in FIG. 4A, respectively, of a second sandwiching member.
Figure 4B:
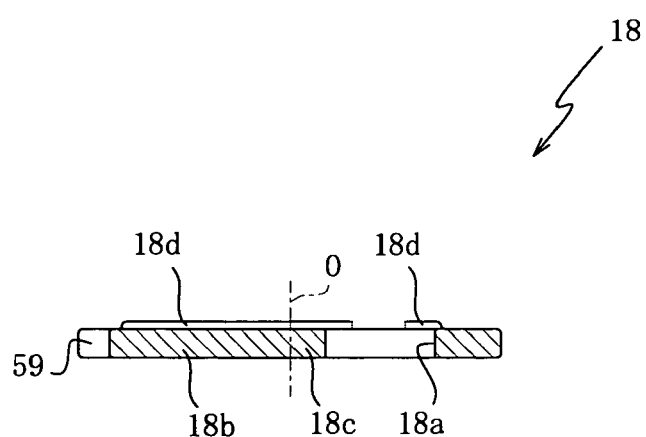

With reference to FIGS. 4A and 4B, a second sandwiching member 18 constituting the partition unit 12 will be described. FIG. 4A is a top plan view of the second sandwiching member 18 whereas FIG. 4B is a sectional view of it taken along IVB-IVB line in FIG. 4A.

The second sandwiching member 18 serves to pinch and hold the elastic partition membrane 15 together with the first sandwiching member 17 to constrain (regulate the displacement of) the elastic partition membrane 15, and is formed in a generally disc form having the axis center O from a metal material such as aluminum alloy, as shown.

The second sandwiching member 18 includes, as shown, an opening 18a apertured in a nearly circular form and three displacement-regulating ribs 18b extending from a nearly central position of the opening 18a toward the marginal portion, radially and rectilinearly.

The opening 18a, the displacement-regulating ribs 18b, a strain-inhibiting portion 18c, and arresting wall portions 18d are constructed in the same pattern (i.e., the same in their positions, sizes and ranges, etc.) as that of the opening 17a, the displacement-regulating ribs 17b, and the like of the first sandwiching member 17, and the description of these will be omitted, accordingly.

The second sandwiching member 18 is, as shown, provided with the recessed portion 59 formed by cutting out the outer marginal portion. The recessed portion 59 is a part that is mated with the raised portion 56 of the orifice member 16 thereby to perform the positioning of a relative rotational direction position of the second sandwiching member 18 to the orifice member 16 (first sandwiching member 17).

Figure 7A:
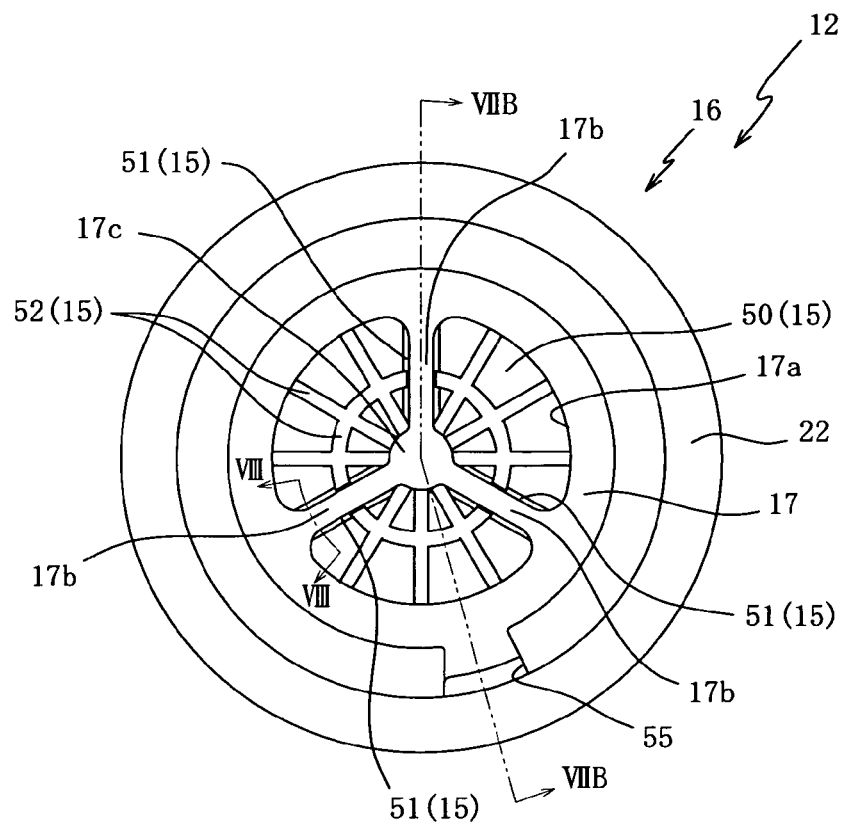
FIG. 7A is a top plan view of a partition unit.
Figure 7B:
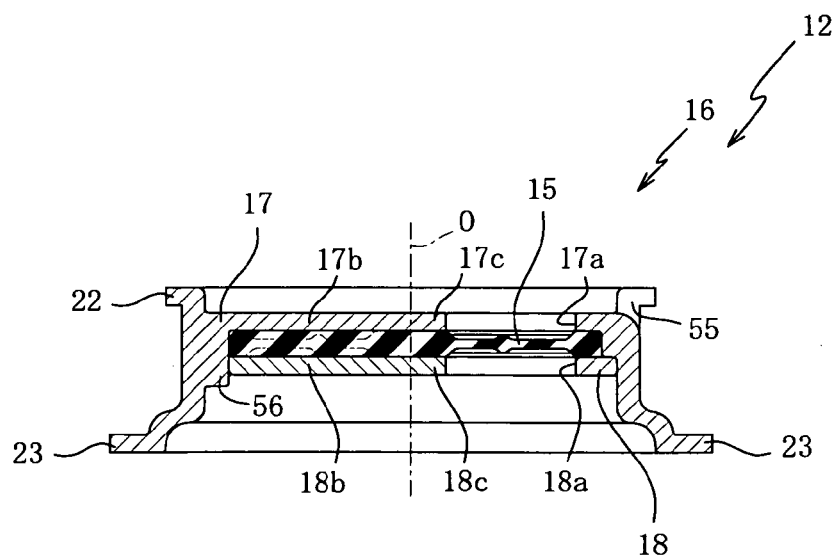
FIG. 7B is a sectional view of the partition unit taken along VIIB-VIIB line of FIG. 7A.

That is, the second sandwiching member 18 is, at the assembling step of the partition unit 12, inserted from a lower opening of the orifice member 16 to be press fitted in the inner peripheral surface side thereof (cf. FIGS. 7A and 7B). At that time, the recessed portion 59 is made to fit with the raised portion 56 of the orifice member 16, whereby it is possible to position the respective displacement-regulating ribs 18b of the second sandwiching member 18 in corresponding positions (namely, overlapping positions when viewed in the axis center direction) to the displacement-regulating ribs 17b of the orifice member 16 (first sandwiching member 17).

The positioning in depth direction of the second sandwiching member 18 to the orifice member 16, namely, a distance between opposing surfaces of the first sandwiching member 17 and the second sandwiching member 18 is performed by abutting the upper end part of the second sandwiching member 18 against a step (cf. FIGS. 3A, 3B) formed on the inner peripheral surface of the orifice member 16.

Figure 5A:
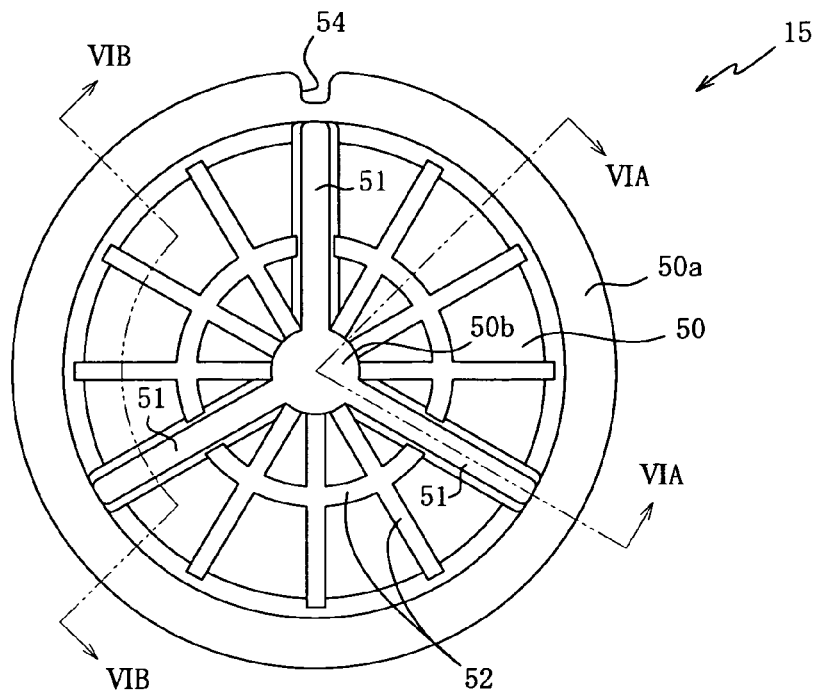
FIG. 5A and FIG. 5B are a top plan view and a bottom view, respectively, of an elastic partition membrane.
Figure 5B:
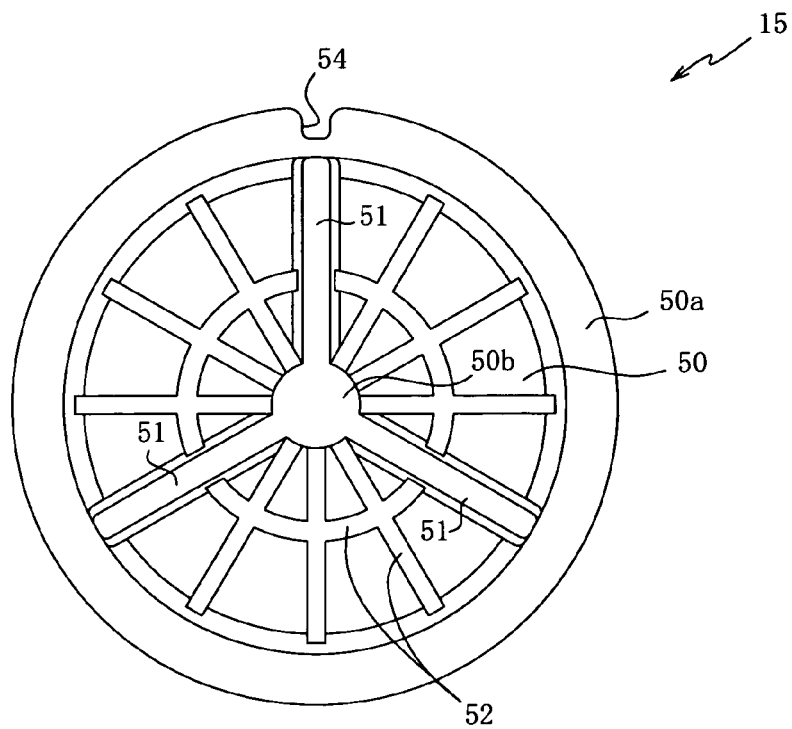
Figure 6A:
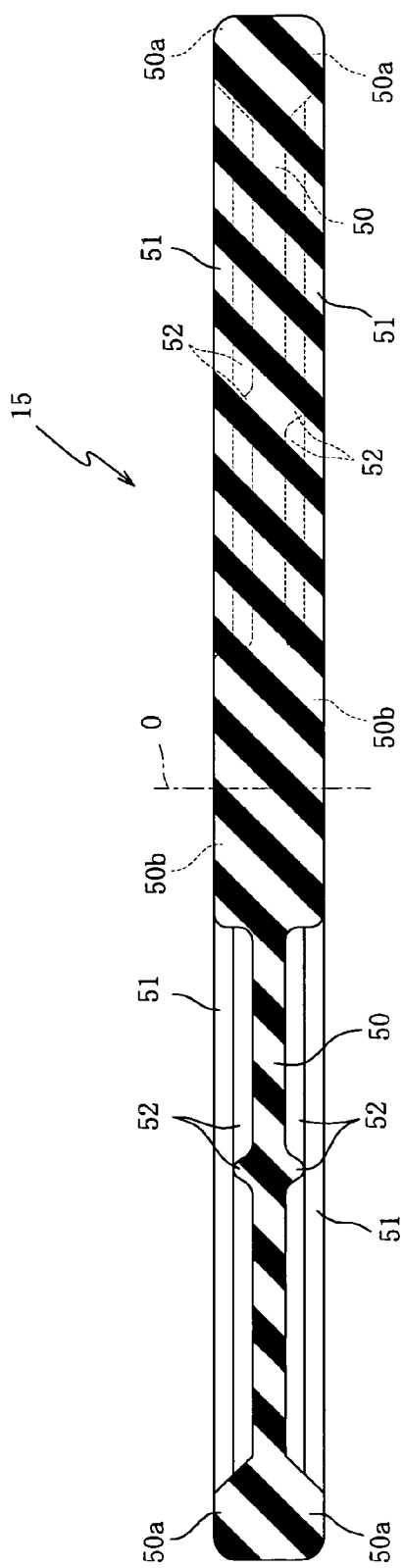
FIG. 6A is a sectional view of the elastic partition membrane taken along VIA-VIA line in FIG. 5A.
Figure 6B:
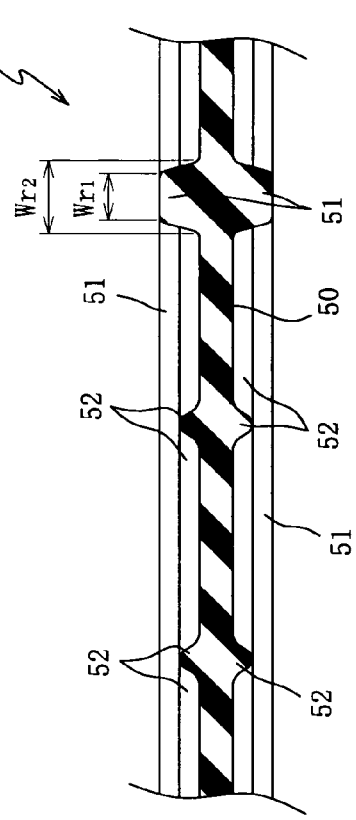
FIG. 6B is a sectional view of the elastic partition membrane taken along VIB-VIB line of FIG. 5A.

Now referring to FIGS. 5A, 5B, 6A, 6B, the elastic partition membrane 15 constituting the partition unit 12 will be described. FIG. 5A and FIG. 5B are a top plan view and a bottom face view, respectively, of the elastic partition membrane 15. FIG. 6A is a sectional view of the elastic partition membrane 15 taken along VIA-VIA line in FIG. 5A whereas FIG. 6B is a sectional view of it taken along VIB-VIB line in FIG. 5A.

The elastic partition membrane 5 is a rubber membrane formed in a generally disc form from a rubber-like elastomer, and accommodated in the partition unit 12 as stated above to perform the action of mollifying hydraulic pressure difference between the first and second liquid chambers 11A, 11B while displacement thereof is regulated by the first and second sandwiching members 17, 18.

The elastic partition membrane 15 is, as shown, mainly comprised of a main membrane body 50 of a generally disc form, and the displacement-regulating protrusions 51 and auxiliary protrusions 52 provided projectingly on both surfaces of the main membrane body 50.

The main membrane body 50 is provided, on both face sides thereof (upside and downside), with the pinched portion 50a and the strain-inhibiting portion 50b in a projecting manner. These pinched portion 50a and strain-inhibiting portion 50b are pinched and held between the first and second sandwiching members 17, 18 from both sides, and the pinched portion 50a is configured in an annular shape in the marginal part of the main membrane body 50 and the strain-inhibiting portion 50b, in a circular form in the virtually central part of the main membrane body 50.

Top heights of these portions 50a, 50b are set in a substantially equal height dimension to a top height of the displacement-regulating protrusions 51. The strain-inhibiting portion 50b is configured in a circular form that is concentric with and of the same diameter as or a higher diameter than the strain-inhibiting portions 17c, 18c of the first and second sandwiching members 17, 18. Thereby it is possible to suppress concentration of the deformation magnitude (strain) of the elastic partition membrane 15 thereby to enhance its durability and concurrently, it is possible to avoid collision of the elastic partition membrane 15 with the first and second sandwiching members 17, 18 thereby to suppress generation of strange sounds.

The elastic partition membrane 15 is, as shown in FIGS. 5A, 5B, provided with the recessed portion 54 formed by cutting out the outer marginal portion (pinched portion 50a) of the main membrane body 50. The recessed portion 54 is a part that mates with the raised portion 56 of the orifice member 16 to position a relative rotational direction position of the elastic partition membrane 15 to the orifice member 16 (the first sandwiching member 17), similarly to the case with the second sandwiching member 18 (cf. FIGS. 4A, 4B) described above.

At the assembling process step of the partition unit 12, the recessed portion 54 is made to fit the raised portion 56 therein, thus performing locating of the rotational direction position, whereby it is possible to position the displacement-regulating protrusions 51 (which will be later described) of the elastic partition membrane 15 in corresponding positions (namely, overlapping positions when viewed in the axis center direction) to the displacement-regulating ribs 17b, 18b of the first and second sandwiching members 17, 18.

Further in this case, slanting surfaces of the pinched portion 50a are caught engagingly by the arresting wall portions 17d, 18d of the first and second sandwiching members 17, 18, and positioning in the radial direction of the elastic partition membrane 15 to the first and second sandwiching members 17, 18 is performed.

The displacement-regulating protrusions 51 are rib-like protrusions that are brought into abutment against the displacement-regulating ribs 17b, 18b of the first and second sandwiching members 17, 18, and arranged, in the assembled state of the partition unit 12, in positions corresponding to the displacement-regulating ribs 17b, 18b (namely, the displacement-regulating protrusions 51 and the displacement-regulating ribs 17b, 18b overlap one upon another when viewed in the axis center direction).

More specifically, three pieces of the displacement-regulating protrusions 51 are arranged in a radial and rectilinear fashion relative to the axis center O, as illustrated in FIGS. 5A, 5B and equidistantly in the circumferential direction (ca. 120 degree distance), which arrangement thus corresponds to the arrangement of the respective displacement-regulating ribs 17b, 18b.

Further the displacement-regulating protrusions 51 are disposed at both surfaces (upside and downside) of the elastic partition membrane 15 symmetrically (namely, disposed so as to overlap as viewed in the axis center direction), and the protrusion width and protrusion height of the respective displacement-regulating protrusions 51 are respectively made to be substantially the same.

The protrusion height of the displacement-regulating protrusions 51 is, as shown in FIGS. 6A, 6B, set to be the same height as heights of the pinched portion 50a and the strain-inhibiting portion 50b, and in the assembled state of the partition unit 12 (cf. FIGS. 7A, 7B), set so that their top portions may abut against the displacement-regulating ribs 17b, 18b in a somewhat compressed state.

Therefore no clearance is produced between the displacement-regulating protrusions 51 and the displacement-regulating ribs 17b, 18b, and even if the elastic partition membrane 15 is displaced, attended with input of a large amplitude vibration, there occurs no collision of the top portions of the displacement-regulating protrusions 51 with the displacement-regulating ribs 17b, 18b. As a result, it is possible to avoid the generation of strange sounds attributed to the collision of the displacement-regulating protrusions 51 with the displacement-regulating ribs 17b, 18b, and to that extent, it is possible to achieve a further reduction of strange sounds.

Figure 8:
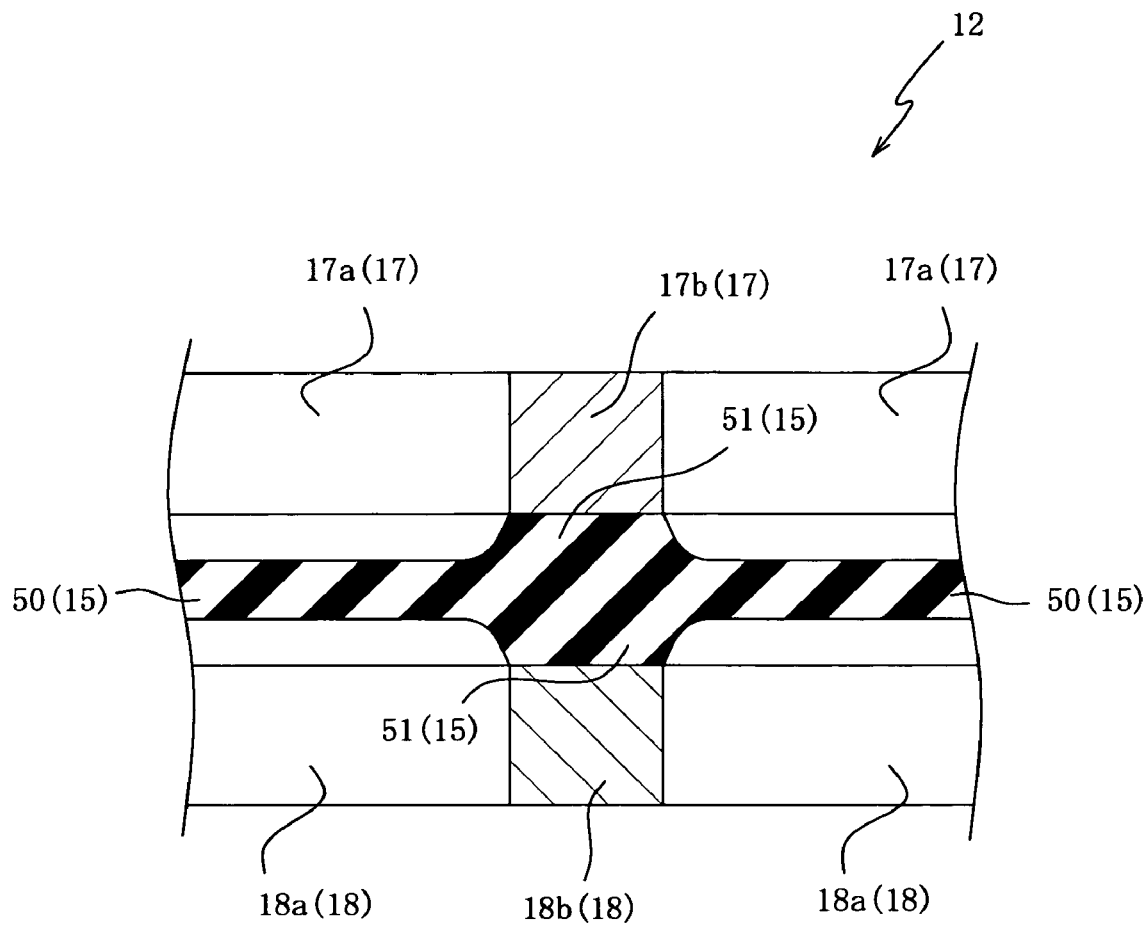
FIG. 8 is a sectional view of the partition unit taken along VIII-VIII line in FIG. 7.

Here, the displacement-regulating protrusions 51 are each preset, as shown in FIG. 6B, so that a protrusion width Wr1 of the top side is narrower than a protrusion width Wr2 of the foot side (the main membrane body 50 side) (Wr1<Wr2) and formed so that the protrusion width Wr1 of the top side is somewhat wider than the rib width of the displacement-regulating ribs 17b, 18b (cf. FIG. 8).

Consequent upon that, it is possible to suppress that the elastic partition membrane 15 collides with the displacement-regulating ribs 17b, 18b, thus suppressing the generation of strange sounds. In particular, even where the displacement-regulating protrusions 51 are deviated relative to the displacement-regulating ribs 17b, 18b in the circumferential direction (e.g., lateral direction in FIG. 8) owing to dimensional tolerances of respective parts, an assembling tolerance upon assembling working, etc., under the condition that the protrusion width Wr2 of the foot side of the displacement-regulating protrusions 51 is thus made larger than the rib width of the displacement-regulating ribs 17b, 18b, it is possible to mollify the collision of the elastic partition membrane 15 with the displacement-regulating ribs 17b, 18b, thereby to effectively suppress the generation of strange sounds attributed to the collision.

The auxiliary protrusions 52 are rib-shaped protrusions for preventing any failure, e.g. tearing of the elastic partition membrane 15, and, as shown in FIGS. 5A, 5B, 6A, 6B, formed of a combination of radial, straight-line portions and annular portions relative to the axis center O of the elastic partition membrane 15. The protrusion height and the protrusion width of the respective auxiliary protrusions 52 are respectively the same.

As illustrated in FIGS. 6A, 6B, the auxiliary protrusions 52 are each preset so that the protrusion width is narrower and the protrusion height is lower than the displacement-regulating protrusions 51, and consequently, it is possible to suppress the rise in stiffness of the overall elastic partition membrane 15 to maintain a low dynamic spring characteristic upon inputting of small amplitude vibration.

In the following, the assembling state of the partition unit 12 will be described referring to FIGS. 7A, 7B and 8. FIG. 7A is a top plan view of the partition unit 12 and FIG. 7B is a cross-sectional view of the partition unit 12 taken along VIIB-VIIB line of FIG. 7A. FIG. 8 is a cross-sectional view of the partition unit 12 taken along VIII-VIII line in FIG. 7.

In the assembling state of the foregoing partition unit 12, when viewed in the axis center direction shown in FIG. 7B as described above, the displacement-regulating ribs 17b of the first sandwiching member 17 and the displacement-regulating ribs 18b of the second sandwiching member 18 coincide in rotational direction position with each other, and the displacement-regulating ribs 17b, 18b and the displacement-regulating protrusions 51 of the elastic partition membrane 15 coincide in rotational direction position with each other. In this case, the top portions of the displacement-regulating protrusions 51 abut against the displacement-regulating ribs 17b, 18b in a somewhat compressed state, as shown in FIG. 8.

To summarize, according to the hydraulic antivibration device 100 of this invention, upon inputting of a small amplitude vibration, the elastic partition membrane 15 can mitigate effectively the hydraulic pressure difference between the first and liquid chambers 11A, 11B likewise as in the conventional elastic membrane structure, whereby it is possible to achieve a reduction of dynamic spring value. On the other hand, upon inputting of a large amplitude vibration, the displacement-regulating ribs 17b, 18b can regulate a displacement of the elastic partition membrane 15 to elevate the stiffness of the elastic partition membrane 15 as a whole and to enhance the damping characteristic by that elevated amount. Further because the displacement-regulating ribs 17b, 18b are provided only in corresponding positions to the displacement-regulating protrusions 51, it is possible to avoid abutment of the elastic partition membrane 15 against the first and second sandwiching members 17, 18, thereby to achieve a substantial reduction of strange sounds.

The following are test results of characteristics evaluation test, wherein a relation between the number of the displacement-regulating ribs 17b, 18b (displacement-regulating protrusions 51) and dynamic characteristics is studied.

Here, the hydraulic antivibration device 100 is required to achieve a low dynamic spring characteristic upon idling or inputting of vibrations of small amplitude such as booming noise range (in general, frequency: 20 Hz~40 Hz, amplitude: ±0.05 mm~±0.1 mm), a reduction of strange sounds upon inputting of large amplitude vibration such as cranking vibration (in general, frequency: 10 Hz~20 Hz, amplitude: ±1 mm~±2 mm), and a high damping characteristic upon inputting of an intermediate amplitude vibration (shake range).

In the characteristics evaluation test, employed were the invention hydraulic antivibration device 100 (designated as "the invention product"), a comparative hydraulic antivibration device wherein respective numbers of the displacement-regulating ribs 17b, 18b (the protrusions 51) are reduced to 2 pieces (designated as "2-piece type product") and another comparative hydraulic antivibration device wherein the numbers of the displacement-regulating ribs 17b, 18b of the protrusions 51 are increased to 4 pieces (designated as "4-piece type product"), and maximum values of the invention product, the 2-piece type product and the 4-piece type product were measured under the condition that the dynamic spring value is the same upon idling (inputting of small amplitude vibration).

In the invention product, three pieces of the displacement-regulating ribs 17b, 18b (displacement-regulating protrusions 51) are disposed at intervals of 120 degrees in the circumferential direction whereas in the 2-piece type product and the 4-piece type product, the displacement-regulating ribs are disposed at intervals of 180 degrees and of 90 degrees, respectively. These 2-piece type product and 4-piece type product are constructed to be only distinct in piece number (circumferential interval) of the displacement-regulating ribs 17b, 18b (displacement-regulating protrusions 51) from the invention product, but the same as to material, shape, dimension, and the like of the other elements.

In the characteristics evaluation test, first, tuning was applied (for example, rubber hardness of the elastic partition membrane 15 was adjusted) to the invention product, the 2-piece type product and the 4-piece type product so that dynamic spring values upon idling (frequency: 30 Hz, amplitude: ±0.05 mm) of them are the same, and then, frequency was continuously varied while inputting an amplitude in the shake range (±0.5 mm). And maximum (peak) values of the damping characteristic obtained thereby were measured.

As a result of the measurement of maximum value of damping characteristic, it was confirmed that the invention product could ensure a value nearly equal (ca. 90%) to that of the 4-piece type product and obtain the value of 1.5 times that of the 2-piece type product. Therefore it was corroborated with the invention product that while making both of a low dynamic spring characteristic and a high damping characteristic compatible, a high longevity characteristic of the elastic partition membrane 15 could also be obtained.

More specifically with the 4-piece type product, since the intersecting angle of the respective displacement-regulating ribs 17b, 18b is small (ca. 90 degrees), the displacement amount (strain) of the elastic partition membrane 15 concentrates on the vicinity of the intersecting part and tearing of the membrane is liable to occur, posing a problem in durability. In contrast, with the invention product, since the intersecting angle of ca. 120 degrees is large enough to suppress such concentration of strain of the elastic partition membrane 15, thus enabling it to enhance the durability.

Further, strange sounds evaluation test was also conducted simultaneously, wherein when a predetermined vibration (frequency: 15 Hz, amplitude: ±1 mm) was input from the engine side (the first attachment fitting 1 side), the acceleration speed value output from the car body frame side (the second attachment fitting 2 side) was measured as strange sounds index. As a result, the strange sounds index value was nearly naught with all of the testing products. Thus it is possible to reduce more significantly the strange sounds than the conventional movable membrane structure and to obtain extremely good results equal to those of the elastic membrane structure.

The invention has been described so far on the basis of the foregoing embodiment, but this invention is by no means limited to that, and it will be appreciated that various modifications and variations can be made without departing from the scope and spirit of the invention.

For example, the description has been made in the embodiment above where the auxiliary protrusions 52 are provided projectingly at the elastic partition membrane 15, but this is not limitative and it is naturally possible to omit the provision of the auxiliary protrusions 52. Further in the embodiment above, the protrusion height of the top portions of the displacement-regulating protrusions 51 in the assembled state of the partition unit 12 is set so that the top portions may abut against the displacement-regulating ribs 17b, 18b in a somewhat compressed state, but it is not necessarily limited thereto and may be set so that the top portions may abut against the displacement-regulating ribs 17b, 18b without being compressed. In the foregoing embodiment, the elastic partition membrane 15 is singly molded by vulcanization and pinched and held between the first and second sandwiching members 17, 18. However, the invention is not necessarily limited to this, but it is naturally possible to construct so that the elastic partition membrane 15 is vulcanization bonded to either of the first and second sandwiching members 17, 18.

The embodiment above has been described with the hydraulic antivibration device 100 of a so-called single orifice type wherein the first liquid chamber 11A and the second liquid chamber 11B are put in communication with each other through a single orifice 25, but the invention is not necessarily limited to this, and it is naturally possible to apply the invention to a so-called double orifice type of hydraulic antivibration device.

By the double-orifice type of hydraulic antivibration device is meant the one constructed of a main liquid chamber, a first and a second subsidiary liquid chambers, and a first and a second orifices, respectively, putting the first subsidiary liquid chamber and the main liquid chamber in communication with each other, and the second subsidiary liquid chamber and the main liquid chamber in communication with each other.

What is claimed is:

1. A hydraulic antivibration device comprising:
a first attachment fitting;
a cylindrical second attachment fitting;
a vibration-isolating base interconnecting the second attachment fitting and the first attachment fitting and composed of an elastomer;
a diaphragm fitted to the second attachment fitting to form a liquid-filled chamber between the diaphragm and the vibration-isolating base;
a partition unit comparting the liquid-filled chamber into a first liquid chamber on the vibration-isolating base side and a second liquid chamber on the diaphragm side; and
an orifice putting the first liquid chamber and the second liquid chamber into communication with each other;
the partition unit including an elastic partition membrane composed of an elastomer, a cylinder member accommodating the elastic partition membrane, and a pair of sandwiching members regulating the displacement of the elastic partition membrane accommodated in the cylinder member from both surface sides thereof,
wherein said pair of the sandwiching members each include an opening apertured in a generally circular form and three displacement-regulating ribs extending from a nearly central position of the opening toward a marginal portion of the opening radially and rectilinearly and disposed substantially equidistantly in the circumferential direction;
the one sandwiching member of the pair of sandwiching members is formed integrally with an inner peripheral surface side of the cylinder member whereas the other sandwiching member is press fitted in the inner peripheral surface side of the cylinder member;
the elastic partition membrane is provided with a main membrane body formed in a generally disc form having a larger diameter than the openings of the sandwiching members, and, on either face side of the main membrane body, with three displacement-regulating protrusions extending from a nearly central portion of the main membrane body toward a marginal portion of the main membrane body radially and rectilinearly and projecting on each face side, the displacement-regulating protrusions being disposed substantially equidistantly in the circumferential direction;
the displacement-regulating protrusions are set in such a height dimension that top portions thereof can abut against the displacement-regulating ribs and formed so that a protrusion width at the top portions is narrower than or substantially equal to a protrusion width of foot portions of the displacement-regulating protrusions and the protrusion width of the foot portions is wider than a rib width of the displacement-regulating ribs;
wherein in the assembled state of the partition unit, the marginal portion of the main membrane body is over its full circumference pinched and held by the sandwiching members from both surface sides thereof and the respective displacement-regulating protrusions are disposed in corresponding positions to the respective displacement-regulating ribs.

2. The hydraulic antivibration device as set forth in claim 1, wherein the displacement-regulating protrusions are formed so that the protrusion width at their top portions is wider than the rib width of the displacement-regulating ribs.

3. The hydraulic antivibration device as set forth in claim 1, wherein the cylinder member is provided with a raised portion projecting toward its inner peripheral face, and the elastic partition membrane and the other sandwiching member are provided with respective recessed portions cut out at their outer margins and capable of fitting with the raised portion, so that in the assembled state of the partition unit, a relative rotational direction position between the pair of the sandwiching members and the elastic partition membrane may be positioned by fitting of the raised portion into the recessed portions and the displacement-regulating protrusions are disposed in the corresponding positions to the displacement-regulating ribs.

4. The hydraulic antivibration device as set forth in claim 2, wherein the cylinder member is provided with a raised portion projecting toward its inner peripheral face, and the elastic partition membrane and the other sandwiching member are provided with respective recessed portions cut out at their outer margins and capable of fitting with the raised portion, so that in the assembled state of the partition unit, a relative rotational direction position between the pair of the sandwiching members and the elastic partition membrane may be positioned by fitting of the raised portion into the recessed portions and the displacement-regulating protrusions are disposed in the corresponding positions to the displacement-regulating ribs.

5. The hydraulic antivibration device as set forth in claim 1, wherein the main membrane body is provided, at least at its one face side, with auxiliary protrusions in a residual area of the area where the displacement-regulating protrusions are provided projectingly;

the auxiliary protrusions are at least constructed so that a protrusion height thereof is lower and a protrusion width thereof is narrower than the displacement-regulating protrusions.

6. The hydraulic antivibration device as set forth in claim 2, wherein the main membrane body is provided, at least at its one face side, with auxiliary protrusions in a residual area of the area where the displacement-regulating protrusions are provided projectingly;

the auxiliary protrusions are at least constructed so that a protrusion height thereof is lower and a protrusion width thereof is narrower than the displacement-regulating protrusions.

7. The hydraulic antivibration device as set forth in claim 3, wherein the main membrane body is provided, at least at its one face side, with auxiliary protrusions in a residual area of the area where the displacement-regulating protrusions are provided projectingly;

the auxiliary protrusions are at least constructed so that a protrusion height thereof is lower and a protrusion width thereof is narrower than the displacement-regulating protrusions.

8. The hydraulic antivibration device as set forth in claim 4, wherein the main membrane body is provided, at least at its one face side, with auxiliary protrusions in a residual area of the area where the displacement-regulating protrusions are provided projectingly;

the auxiliary protrusions are at least constructed so that a protrusion height thereof is lower and a protrusion width thereof is narrower than the displacement-regulating protrusions.

* * * * *